(12) United States Patent
Purcell, Jr. et al.

(10) Patent No.: US 6,444,601 B1
(45) Date of Patent: *Sep. 3, 2002

(54) PURIFIED ATTAPULGITE CLAY

(75) Inventors: Robert Joseph Purcell, Jr., Glen Arm; Dennis Clay Parker, Sparks, both of MD (US)

(73) Assignee: ITC, Inc., Hunt Valley, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/602,827

(22) Filed: Jun. 23, 2000

Related U.S. Application Data (63) Continuation-in-part of application No. 09/190,528, filed on Nov. 12, 1998, now Pat. No. 6,130,179.

(51) Int. Cl.$^7$ ................................................ B01J 21/16
(52) U.S. Cl. .................... 502/62; 502/80; 241/24.23; 209/5; 209/47; 501/148; 516/79
(58) Field of Search .................. 502/62, 80; 241/24.23; 208/5, 47; 501/148; 516/79

(56) References Cited

U.S. PATENT DOCUMENTS

| | | | |
|---|---|---|---|
| 3,596,760 A | 8/1971 | Jacobs et al. | 209/5 |
| 4,444,665 A | * 4/1984 | Hildebrandt | |
| 4,966,871 A | 10/1990 | Brooks | 501/150 |
| 5,049,532 A | * 9/1991 | Brooks et al. | |
| 5,158,918 A | * 10/1992 | Brooks et al. | |
| 5,320,773 A | * 6/1994 | Perman et al. | |
| 5,358,120 A | 10/1994 | Gantt et al. | 209/4 |
| 6,130,179 A | * 10/2000 | Sampson et al. | |

* cited by examiner

*Primary Examiner*—Steven P. Griffin
*Assistant Examiner*—Christina Ildebrando
(74) *Attorney, Agent, or Firm*—Robert M. Gamson; Leonard Bloom (57) ABSTRACT

A method for producing an Attapulgite clay (Fuller's Earth) that significantly removes other types of clays and minerals, resulting in improved performance. A unique dispersant is used that will fully disperse the individual Attapulgite particles in water such that the particles remain in suspension, and allow the non-Attapulgite clay particles to be liberated, which then can be easily separated through various techniques. The Attapulgite clay may be recovered from the dispersion and dried in such a manner to produce a finely sized powder from ore, without the need for any grinding or milling operation. The dried Attapulgite clay has a free moisture content of 2–3%. The dried Attapulgite clay with adsorbed dispersant is redispersed in water and retains thixotropic properties.

16 Claims, 5 Drawing Sheets

PURIFICATION OF ATTAPULGITE CLAY

PURIFIED ATTAPULGITE CLAY

CROSS REFERENCE TO RELATED APPLICATIONS

The present invention is a continuation-in-part of Application Ser. No. 09/190,528, filed Nov. 12, 1998, now U.S. Pat. No. 6,130,179, the disclosure of which is incorporated in its entirety by reference herein.

FIELD OF INVENTION

This invention relates to the ability to treat naturally occurring clay deposits and more particularly, to selectively disperse discrete, individual particles of Attapulgite while liberating other non-Attapulgite minerals such as Montmorillonite, Sepiolite, Bentonite, Calcium Carbonate, Silica and Kaolin, from in between the Attapulgite Bundles. The invention relates to a dry clay which is readily re-dispersed.

BACKGROUND OF THE INVENTION

Attapulgite Clay particles naturally occur as colloidal, high aspect ratio, rod shaped particles that are tightly bundled together as clusters. The rods tend to be all equal in particle length and diameter, similar to a group of bound pipes or drinking straws. The individual clusters are agglomerated randomly. The Attapulgite deposits located in northern Florida and southeastern Georgia were formed in shallow, magnesium rich bay waters, where other clay minerals were formed simultaneously or were introduced through air and water movements. Other minerals such as silica, calcium carbonate and magnesium carbonate were also formed in place or were transported into the deposit during its formation, resulting in a variety of non Attapulgite materials being present in levels approaching 20 weight percent or more. In order for the Attapulgite to be in a physical form acceptable for commercial use, it needs to be processed into a powder. The Attapulgite clay is historically processed by selectively mining the deposit, classifying the ore according to its grit content and gelling properties, drying, mechanically grinding or milling ore with minimal amounts of contaminants, followed by particle size separation and drying to a moisture content of approximately 10% to 6%. The non-Attapulgite matter is also reduced in size and is partially removed during the particle size classification process. The non-clay minerals can be abrasive and must either be removed or reduced in size to lessen their abrasive characteristics in order for the Attapulgite powder to be useful in end use applications.

A dry grinding/milling operation will partially break up the bundle clusters with the undesirable result of fracturing of individual Attapulgite particles. This may be, in part, due to the presence of grit and particles of non-clay matter which are present in the clay ore and which break and damage the individual rods during the dry grinding/milling operation. The individual Attapulgite particles provide the absorptive, thixotropic, anti-settling, and/or binding properties to a wide variety of end use applications. The crystal structure of Attapulgite clay has positive and negatively charged sites on the lateral surfaces of each particle and at the ends of each individual particle. When the crystals were formed they joined together in the straw clusters with random bundles orienting themselves to neutralize the charges. When these individual particles are dispersed by chemical or mechanical means the particles seek to satisfy the negative and positive charges by randomly re-connecting particle to particle instead of forming bundles and clusters. This unique feature of attapulgite clay creates the thixotropic properties and binding properties of Attapulgite. Particles with higher length to width, or aspect ratios, typically are more efficient than particles with lower aspect ratios in providing products with higher gel strength and binding properties.

In end use applications, a chemical dispersant, predominantly tetrasodium pyrophosphate (TSPP), will at best, separate a majority of the Attapulgite bundles into individual particles in an aqueous medium under moderate-to-high shear agitation. TSPP will also disperse other clay types present. Individual clay particles of each clay species present, will remain suspended in water. U.S. Pat. No. 3,569,760 has shown that non-clay minerals will not remain suspended in the water and will settle to the bottom due to gravitational forces if the clay-water slurry is low enough in viscosity. The relatively large non-clay minerals, which by their means of higher hardness, can resist size reduction and thus can also be removed by screening, centrifuging, via sedimentation tanks, hydrocyclone, or other physical separation means. The non-Attapulgite clay minerals, such as Montmorillonite, Smectite, and Sepiolite, will remain mixed in with the Attapulgite clay. The non-Attapulgite clays do not have the same performance characteristics as Attapulgite clay, some which are detrimental to performance in particular applications. At the present time, the suppliers and users of Attapulgite are dependent on the quality of natural deposits for the concentration of non-Attapulgite clay content. The availability of high purity Attapulgite clay relies on the economically inefficient selective mining of the deposits.

Gantt et. al. in U.S. Pat. No. 5,358,120, have shown that other types of previously commercially available dispersants such as sodium polyacrylates can be used with clay. However, sodium polyacrylates with molecular weights less than 4,300, while effective on kaolins and bentonites, are typically not as effective with Attapulgite when compared to TSPP, and thus are not generally used.

Attapulgite clay provides thixotropic and binding properties through the process of re-flocculating after being typically dispersed at less than 5% solids in an aqueous system, whereby a gel structure is generated. Various salts, at additive levels, can act as re-flocculating agents.

Historically, Attapulgite clay is dried to a free moisture content of approximately, 10–16%, with an 8 or 9% minimum. At lower moisture contents, the Attapulgite begins to lose its thixotropic properties and does not readily re-disperse in water. Brooks, in U.S. Pat. No. 4,966,871, has shown that it is possible to vacuum dry Attapulgite down to less than 2% free moisture and still retain its thixotropic properties, the importance being that the attapulgite is dried under vacuum conditions.

Attapulgite clay is frequently used as an additive product, often comprising only 1 to 3 weight percent of the final composition. Attapulgite clay does not disperse completely in a liquid medium at these low concentrations. The believed cause is the lack of clay to clay collisions needed to break up the agglomerates and bundles. A technique used to overcome this behavior is one in which a 20 to 25% slurry is made, and when completely dispersed, it is diluted with water down to the desired ultimate concentration.

There is a need to be able to efficiently and economically separate Attapulgite clay from other clay types, from non-clay minerals while not destroying the high aspect ratio of the particles with mechanical grinding force. There is a need to reduce the moisture content of attapulgite while maintaining gel properties to enhance it economic benefit through concentration of the product for its end use application.

SUMMARY OF THE INVENTION

It is an object of the invention to provide an economical and efficient method to separate Attapulgite clay from other clay components and minerals in clay ore.

It is an object of the invention to use the method to allow for the mining of lower grade deposits which have historically not been useable due to high concentrations of non-clay minerals.

It is an objective of the invention to use the method for the blending of attapulgite ores in slurry form to efficiently produce products with uniform physical and chemical properties.

It is a further object of the invention to provide a purified Attapulgite clay.

It is yet another object of the invention to provide dry Attapulgite clay particles which are readily dispersed in water without addition of dispersant or surfactant.

It is a further object of the present invention to provide a dry particulate Attapulgite clay which has less than 0.5% free moisture content and retains thixotropic properties without using vacuum drying.

In accordance with the teachings of the present invention, there is disclosed a method of processing naturally occurring clay ore to separate Attapulgite clay from other materials. This includes the steps of crushing the clay ore, adding sodium polyacrylate to water, the sodium polyacrylate having a molecular weight between 4,000 and 5,000, preparing a slurry of the clay ore with the aqueous sodium polyacrylate to disperse the Attapulgite clay in the water, dispersing the Attapulgite without fully dispersing the non-Attapulgite Minerals, separating the non-Attapulgite minerals from the Attapulgite and drying the dispersed, purified Attapulgite clay.

Additionally, there is disclosed a wet method of processing naturally occurring clay ore to separate Attapulgite clay from other materials. The method has the steps of crushing the clay ore and adding a dispersant to water. A slurry of the clay ore is prepared with the aqueous dispersant to disperse the Attapulgite clay in the water. The dispersed Attapulgite clay is separated from the non-Attapulgite materials, and the dispersed clay is dried to a free moisture content of approximately 2–3%.

There is further disclosed a wet method for separating and dispersing Attapulgite clay. Naturally occurring clay is crushed. A dispersant is added to water. A slurry of the naturally occurring clay is prepared with the aqueous dispersant wherein the clay is dispersed in the water. Non-Attapulgite materials are separated from the aqueous slurry of Attapulgite clay. The dispersed Attapulgite clay is dried. Up to approximately 35% by weight of the dry Attapulgite clay is added to water. The Attapulgite clay is re-dispersed in the water using a low shear mixer without the addition of further dispersant or a surfactant.

Still further, there is disclosed a purified dried, particulate Attapulgite clay comprising Attapulgite clay separated from non-clay matter, the Attapulgite clay having a free moisture content of approximately 2–3%.

These and other objects of the present invention will become apparent from a reading of the following specification, taken in conjunction with the enclosed drawings.

DESCRIPTION OF THE PREFERRED EMBODIMENTS

We have made the unexpected discovery that the efficiency of a particular sodium polyacrylate, which preferably has a molecular weight of approximately 4,700, allows for higher concentrations of Attapulgite clay in a water slurry at a lower viscosity than is attainable when using TSPP or other sodium polyacrylate dispersants having lower molecular weights. The practical upper limit for processing the Attapulgite concentration when using TSPP as the dispersant is approximately 30%, above which the slurry becomes highly dilatent and the viscosity becomes too high for handling. Other sodium polyacrylates with lower molecular weights will not efficiently disperse the Attapulgite. The approximate 4,700 MW sodium polyacrylate imparts the ability to prepare at least 35% concentration Attapulgite slurry and still have acceptable handling characteristics. This property offers the economic advantage of more efficient manufacture of formulations that begin with a 35% slurry that is diluted down to a lower concentration (typically 1–3% used in suspension fertilizers) as fewer slurry batches need to be prepared to yield the same amount of final product.

Figure 1:
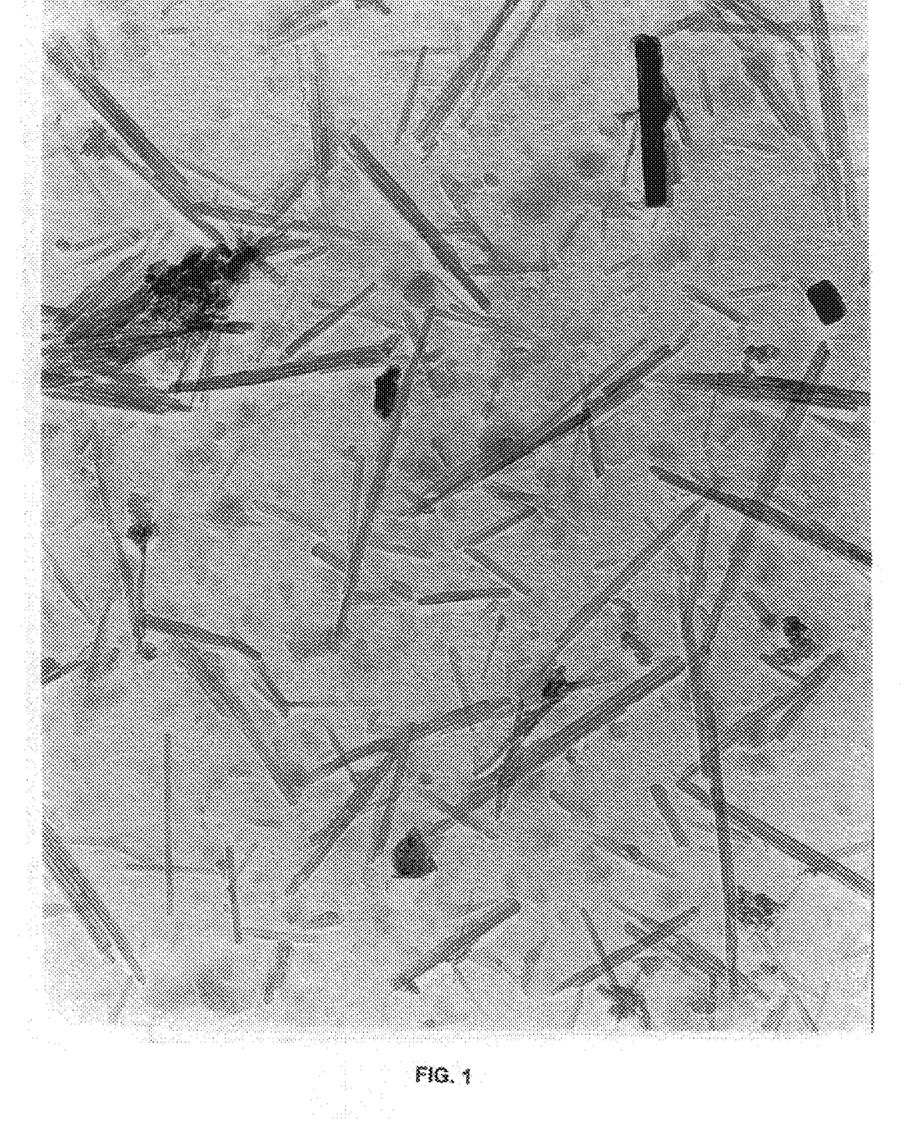
FIG. 1 is an enlarged view of dispersed Attapulgite crystals.
Figure 2:
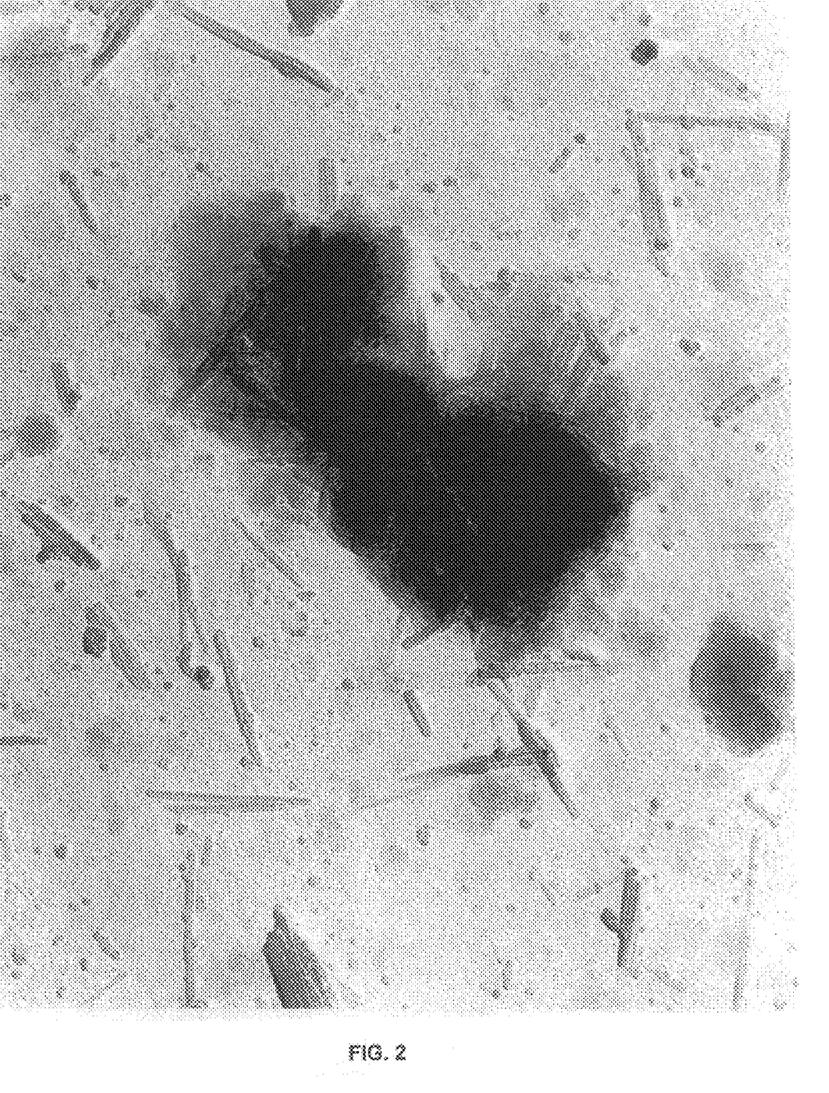
FIG. 2 is an enlarged view of a smectite/Attapulgite cluster.

When further studied, we have made an additional unexpected discovery that by using said higher molecular weight sodium polyacrylate, the Attapulgite particles will rapidly disperse with significantly improved efficiency in water under moderate-to-high shear conditions, (see FIG. 1.). The result is that more of the non-attapulgite clays present will remain as relatively large, liberated particles, along with the non-clay matter present. The non-Attapulgite clays can be easily removed by physical means such as screening or centrifuging along with the non-clay matter. The result is an increased purity form of Attapulgite that is essentially grit free. The 4700 molecular weight sodium polyacrylate does not rapidly disperse smectite, montmorillonite, kaolin or other clay minerals due to its high molecular weight. The relatively lower molecular weight sodium polyacrylates tested will not disperse the Attapulgite particles as efficiently, thus achieving less separation of and non-clay particles. See FIG. 2 where the molecular weight of the sodium polyacrylate used is 2,600.

We have further discovered that even using TSPP, with wet processing and drying in a spray drier or air swept tubular dryer, the resulting product can be re-dispersed with low shear mixing. Previously product dried by conventional drying techniques such as rotary dryers and flash dryers produced a product that would not re-disperse. It is possible to achieve separation of Attapulgite clay from the non-Attapulgite minerals and purification of Attapulgite clay can be achieved with the wet process when using TSPP as the dispersant. The purified Attapulgite can be re-dispersed with low shear up to 35% concentration of slurry solids can be obtained. Re-dispersion of dry clay using TSPP separation has previously been obtainable only with HIGH shear equipment and, even under these conditions, only 10–15% solids were obtainable. In the present invention, there is no need for additional TSPP or a surfactant. The purity Attapulgite clay obtained with TSPP dispersant is not as high as the purity obtained with the high molecular weight sodium polyacrylate. The TSPP is not able to retard the hydration of Smectite minerals found as contaminants in the attapulgite. The non-clay minerals can be removed by screening and centrifuging the slurry. However, the use of TSPP is more economical and for those end uses of Attapulgite clay such as Agricultural grades, where high purity is not essential, an efficient and relatively low cost method is disclosed herein.

We have further discovered that when Attapulgite slurry is prepared with sodium polyacrylate or TSPP, and then dried in a spray drier, an air swept tubular dryer or other low temperature, high turbulence methods of drying, the sodium polyacrylate or the TSPP remain adsorbed on the Attapulgite particles. The dried Attapulgite will readily re-disperse into water without the need for a dispersant or surfactant to be pre-mixed into the water. This does not occur with dry ground Attapulgite dispersed with TSPP and dried by conventional means such as a rotary dryer or a flash dryer. In addition, with the removal of non-clay minerals, higher performance is observed in the ability to provide thixotropy, binding, and suspension behavior.

Another unexpected discovery was the ability of the adsorbed sodium polyacrylate or TSPP to allow the Attapulgite to retain its thixotropic properties when dried to less than 0.5% moisture at atmospheric pressure with high air turbulence, without the need for vacuum drying and/or without the need for a silicone or silane type stabilizer. Commercially, a dryness of approximately 2–3% moisture is practical.

Figure 3:
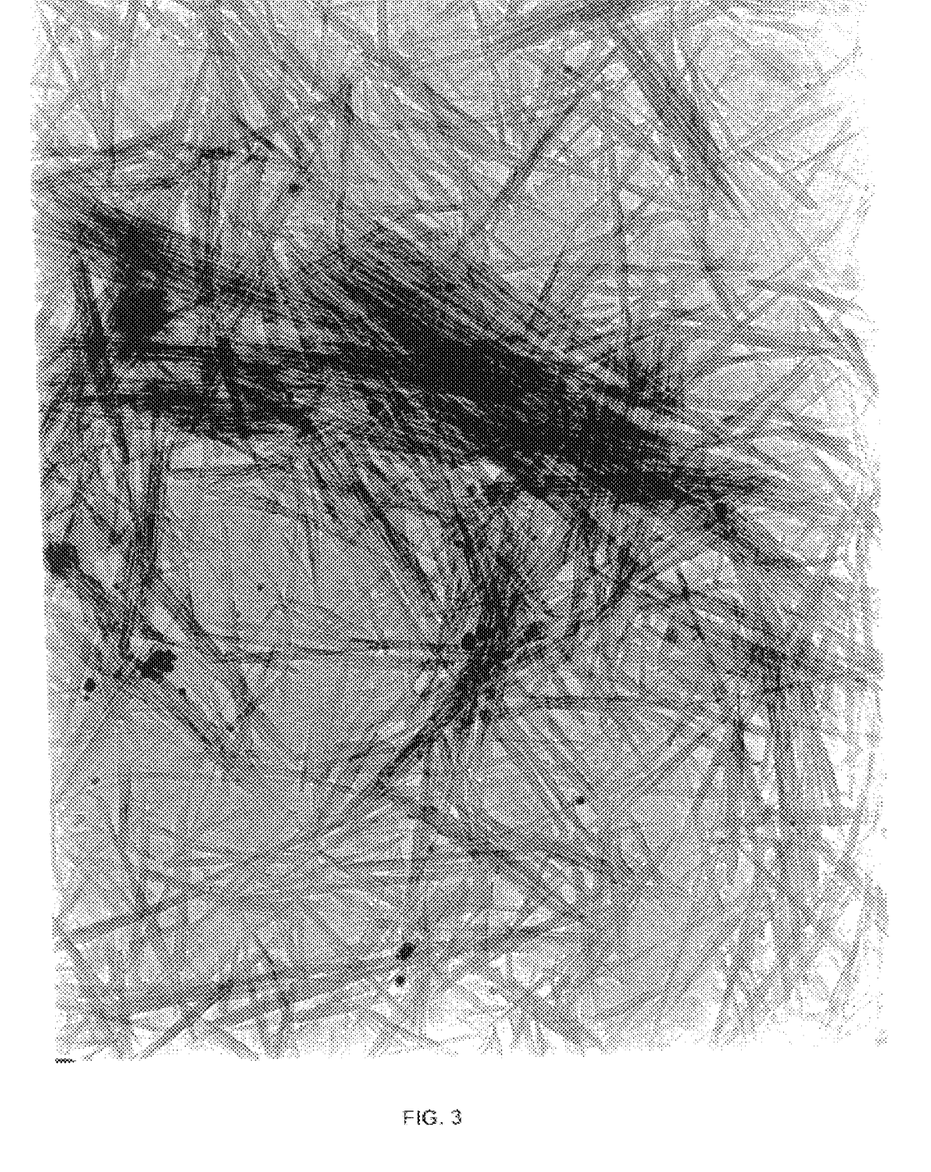
FIG. 3 is an enlarged view of clusters of Attapulgite with other clay and grit obtained by the dry separation process of the prior art.
Figure 4:
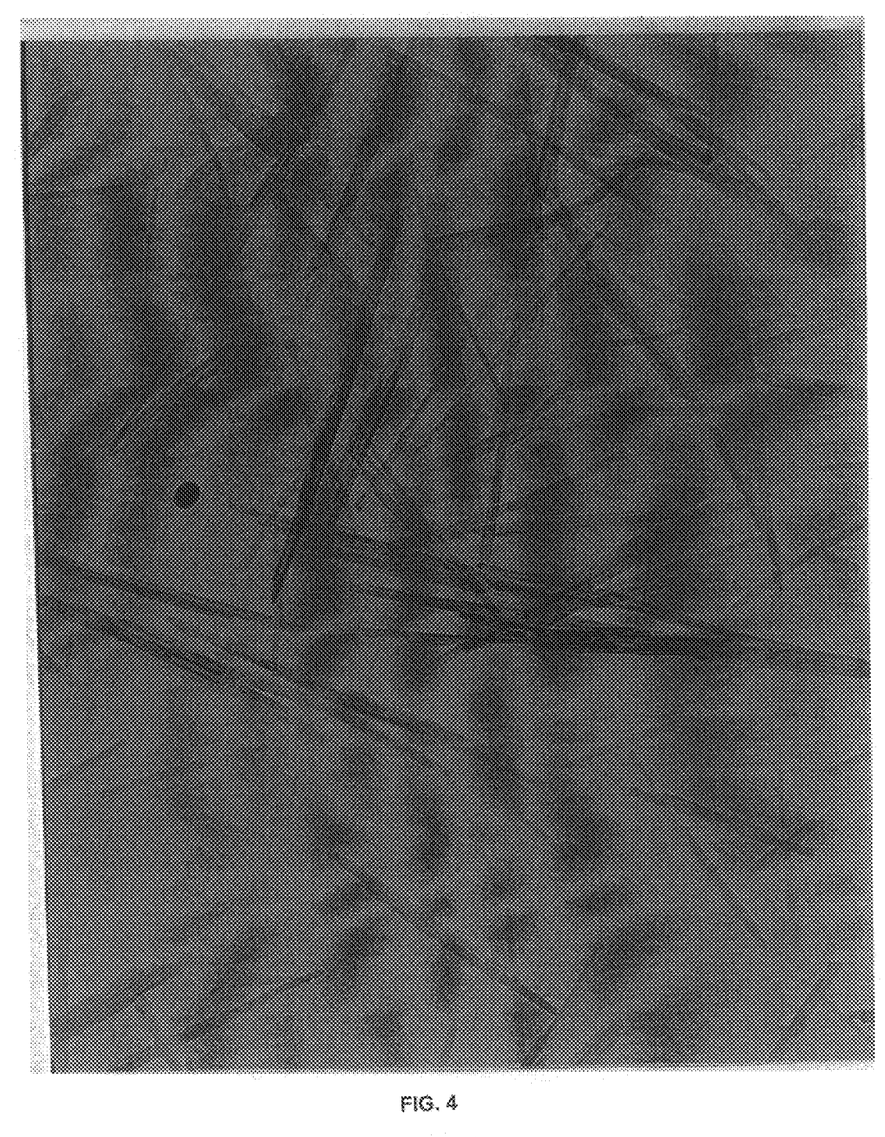
FIG. 4 is an enlarged view of isolated Attapulgite rods obtained by the wet separation process of the present invention.
Figure 5:
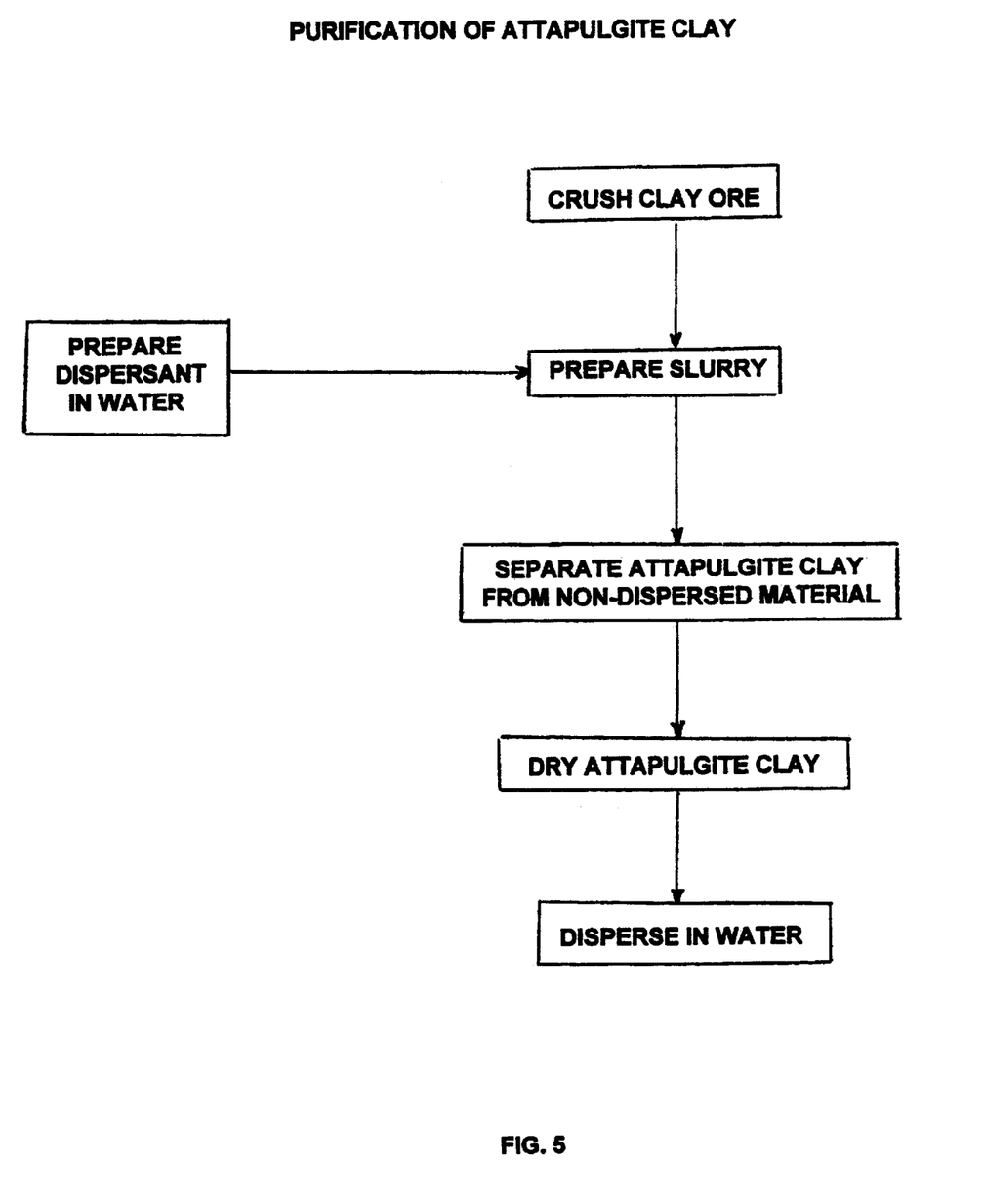
FIG. 5 is a diagram of the purification of Attapulgite clay.

Another unexpected discovery was the wet processing method of attapulgite production results in a higher percentage of high aspect ratio attapulgite crystals being liberated from the individual clusters when compared to attapulgite which is processed by grinding dried attapulgite ore. The removal of the crystalline silica and calcium carbonate by using the wet process eliminates the abrasive grinding experienced in conventional mechanical grinding processes. See FIG. 1 and FIG. 3.

In the present invention, Attapulgite clay ore is mined and crushed into pieces small enough so that they can be blunged into a slurry. The sodium polyacrylate dispersant, having a molecular weight range of between 4,000 and 5,000 is pre-mixed with water. The sodium polyacrylate concentration preferably is between 1 and 4 weight % of the clay content. The Attapulgite clay is gradually added under moderate-to-high shear to the water—sodium polyacrylate solution, until fully dispersed. The Attapulgite bundles and clusters become separated into colloidal particles allowing for the liberation of other non-Attapulgite particles from the dispersed Attapulgite bundles. The non-clay particles are removed along with the non-clay matter including grit, via physical means. The substantially de-gritted Attapulgite clay is then de-watered or dried in dryer that uses, heated turbulent air at atmospheric pressure until the desired residual moisture content is achieved. Preferably, the drying process is at atmospheric pressure at a temperature between 85° C. and 210° C. During the drying process, the particles 'self-coalesce' into loosely bound elongated rods. They do not re-flocculate into tightly bound bundles and agglomerates.

The final form may include a filter cake or a dried powder. The filter cake and/or the dried powder can be easily re-dispersed into water without the use of additional dispersant. One effective drying method which may be employed is spray drying. Spray drying offers the ability to produce uniformly sized granules whose size can be controlled by adjusting the process conditions in the spray dryer. Other air swept drying methods have also been proven to work efficiently where heated turbulent air is used between 85° C. and 210° C. with similar results. Thus, finely sized Attapulgite granules can be made without a grinding or milling procedure that would fracture the Attapulgite crystals, thereby reducing performance.

EXAMPLES 1 THROUGH 9

Samples of various quality clay were slurried, using between 1.0 and 1.8 weight percent, on a dry clay basis, of sodium polyacrylate with a molecular weight between 4,000 and 5,000. The slurries consisted of approximately 25 weight % clay in de-ionized or distilled water. The sodium polyacrylate was mixed with the water until a homogeneous solution was achieved, then the clay was gradually added under moderate-to-high shear, until completely wetted. The slurries were filtered with a 325 mesh screen and then dried into a free flowing powder. X-ray and Atomic Absorption analysis methods were used to compare the compositional quality of the raw material and the finished material. The following species were identified: Attapulgite, smectite clay (i.e., montmorillonite, sepiolite), quartz, calcite, dolomite, apatite, illite, mica, kaolinite, as well as other trace minerals. The results are listed below in Table 1.

TABLE 1

| Material Identification | % Attapulgite | % Smectite | % Quartz | % Calcite |
| --- | --- | --- | --- | --- |
| #1 | 85 | 2 | 7 | <1 |
| #2 | 85 | 2 | 4 | ND* |
| #3 | 90 | 1 | 3 | ND |
| #4 | 85 | 1 | 6 | ND |
| #5 | 90 | 1 | 3 | ND |
| #6 | 85 | 1 | 6 | ND |
| #7 | 90 | <1 | 3 | ND |
| #8 | 60 | 30 | 3 | ND |
| #9 | 60 | 25 | 4 | <1 |

*ND not detected

Specimen #1, the reference specimen, is a relatively high quality grade with 85% Attapulgite content, with a low 2% smectite content, without any processing. Specimen #2, the control specimen, which is specimen #1 that was processed according to the preceding paragraph, except that TSPP was used as the dispersant in place of sodium polyacrylate. Specimen #2 did not exhibit any purification other than some grit removal during the screening. The Attapulgite and smectite contents remained the same. Specimen #3 was also processed from Specimen #1, according to the preceding paragraph, this time using the above-identified sodium polyacrylate dispersant. Specimen #3 tested with an increase in Attapulgite content from 85 to 90%. The smectite content decreased 1%. The remaining 4% is comprised of an additional 1% reduction of quartz plus reduced amounts of apatite, illite and mica. This can be attributed to the increased dispersion of the Attapulgite bundles, freeing up more entrapped contaminant particles via physical separation. Specimens #4 and #6 are two other grades of Attapulgite clay, a low and high gelling grade, respectively which have been processed with TSPP but without the sodium polyacrylate dispersant. Specimens #5 and #7 are the corresponding specimens treated with the sodium polyacrylate dispersant. In both cases, the Attapulgite content increased from 85 to 90%. Specimen #8 is a relatively impure Attapulgite, with a high smectite content of 30%. Upon processing with the sodium polyacrylate dispersant, (Specimen #9) the smectite content is reduced from 30 to 25%, along with a drop in illite/mica content from 6% to 1%.

EXAMPLE 10

A specimen of Attapulgite clay, with a moisture content of between 8 and 13 weight %, was dispersed in tap water at 35% solids, using said sodium polyacrylate dispersant. The viscosity was measured at 300 cps using a Brookfield RVT viscometer. The slurry was then de-gritted with a 325 mesh screen and dried at 105° C. at atmospheric pressure to a powder to approximately the original moisture content. The de-gritted Attapulgite was then re-slurried into water at 35% solids without the use of any additional dispersant. The viscosity was then measured at 340 cps. The slight increase is proportional to the amount of grit removed and the results can be considered similar and within experimental reproducibility.

EXAMPLE 11

A specimen of Attapulgite clay was dispersed using said sodium polyacrylate dispersant in tap water at 35% solids. The slurry was de-gritted and spray dried to yield a dry, powdered Attapulgite. The free moisture content was determined and the viscosity was measured at an industry standard quality control test level of 7% solids in water. The Attapulgite powder was then dried further at approximately 105° C. to produce various free moisture content specimens. These specimens were subsequently tested for their respective viscosities and ability to re-flocculate into a gel structure that provides thixotropic performance.

TABLE 2

| Free Moisture Content (%) | Viscosity @ 7% solids in deionized water (cps) |
| --- | --- |
| 9 | 10 |
| 5 | 8 |
| 1 | 8 |
| 1 | 6 |
| 0.5 | 6 |
| <0.1 | 6 |

The specimen dried to 0.5% free moisture was re-slurried in tap water at 7% solids. The viscosity was approximately 6 cps. Upon the addition of 0.7% (total weight basis) potash, the resulting viscosity obtained was 3,100 cps; indicating the ability to re-flocculate and generate a gel structure.

EXAMPLE 12

A specimen of Attapulgite was slurried into water at 35% solids using various grades of sodium polyacrylate dispersants. The amount of dispersant used was varied between 1 and 2.5% in order to determine the most effective level, using the minimum viscosity obtained as the criteria (an indication of degree of dispersion). The results were recorded as viscosity vs % dispersant added (Table 3). Note: non-crosslinked sodium polyacrylates with molecular weights greater than approximately 4,700 are not known to exist. It can be expected that, if available, they would exhibit similar or improved performance.

TABLE 3

Viscosity vs. Wt. % Dispersant [Molecular Weight]

| Wt % | [4,700] cps | [4,300] cps | [3,700] cps | [2,600] cps |
| --- | --- | --- | --- | --- |
| 1 | 1,360 | 4,925 | 4,900 | 6,050 |
| 1.25 | 300 | 860 | 1,900 | 3,850 |
| 1.5 | 730 | 1,160 | 1,555 | 2,700 |
| 1.75 | 1,200 | 855 | 1,755 | 2,800 |
| 2 |  | 2,050 | 2,625 | 3,525 |
| 2.25 |  | 2,750 | 2,125 |  |
| 2.5 |  |  | 3,225 |  |

The observable trend is that higher molecular weight sodium polyacrylates are more efficient dispersants.

EXAMPLE 13

The effectiveness of dispersant with respect to the viscosity was tested using dionized water and saturated salt water. Brookfield viscosity values (in cps) were obtained with:

1. 30% crude clay with 3.2% sodium polyacrylate (mw 4,700)
2. 30% crude clay with 2% TSPP
3. 30% crude clay with 2% TSPP which had been dried and rehydrated

|  | A | B | C |
| --- | --- | --- | --- |
| Brookfield in deionized water |  |  |  |
| 10% solids | 0 | 0 | 0 |
| 20% solids | 0 | 0 | 0 |
| 30% solids | 100 | 100 | 250 |
| 40% solids | 6,200 | 23,500 | 26,000 |
| Brookfield in saturated salt water |  |  |  |
| 10% solids | 9,600 | 7,300 | 13,000 |
| 20% solids | no flow | 32,750 | 35,500 |
| Screens* |  |  |  |
| % + 30 | 20.20% | 5.20% | 19.10% |
| % + 40 | 41.30% | 16.80% | 39.00% |
| % + 50 | 59.10% | 30.80% | 58.20% |
| % + 70 | 71.00% | 42.80% | 68.10% |
| % + 100 | 80.20% | 54.00% | 77.70% |
| % + 200 | 90.10% | 70.80% | 88.40% |
| % + 270 | 94.00% | 78.80% | 92.40% |
| % + 325 | 94.80% | 82.00% | 93.60% |
| % + 400 | 95.60% | 84.80% | 94.80% |
| Pan (−400 mesh) | 4.40% | 15.20% | 5.20% |
| % free moisture (final) | 2.16% | 3.80% | 5.20% |

*cumulative % retained

The above results are unexpected compared to Attapulgite clay prepared by methods used prior to this invention. In deionized water without salt, the Attapulgite clay readily disperses and the viscosity is not changed. This is because there is no excess ionic contamination in the Deionized Water, the clay readily disperses but forms no gel structure because there are not enough ions present to flocculate it. However, the relatively high viscosity obtained with 40% solids is most unexpected and is an indication of the ability of the effectiveness of the dispersants in the wet procedure. In previously known dry procedures, TSPP has not demonstrated the ability to disperse the clay in deionized water. The drying and rehydrating of TSPP treated clay has not been known previously.

Salt in water causes the clay to set and gel. Saturated salt water is most effective in producing gelling. Using prior art, it is generally possible to obtain a maximum viscosity in the range of 20,000–25,000 cps. The clay plus dispersant of the present invention produced a viscosity of 32,000 to 35,000 with 20% solids. Viscosities as high as 88,000 cps have been obtained in saturated salt water.

In summary, clay ore is purified and separated from non-Attapulgite material by dispersing the ore in an aqueous solution of sodium polyacrylate having a molecular weight of approximately 4,000–5,000. Non-Attapulgite materials are efficiently liberated from in between the Attapulgite Bundles in this sodium polyacrylate solution. Non-clay material ("grit") is liberated as well. In this manner, the Attapulgite clay can be separated from non-Attapulgite material. The slurry is dried to provide a powder of Attapulgite clay. There is residual sodium polyacrylate in the dried Attapulgite clay such that upon addition of water, the Attapulgite redisperses without the addition of further dispersant. The redispersed Attapulgite clay retains thixotropic properties. Thus, a purified form of Attapulgite clay is provided which is more economical to use. Also, poorer quality clay ore can be processed economically to provide more purified Attapulgite clay.

The method blunging the crude Attapulgite was as follows:

EXAMPLE 14

Three 55 gallon drums of crude Attapulgite were dispersed with TSPP. The slurry was made to 30% solids using 2% TSPP based on the weight of the clay. The blunged slurry was screened over a 200 mesh screen and the −200 mesh fraction passing through the screen was retained for use. The +200 mesh fraction retained by the screen was discarded.

EXAMPLE 15

Three 55 gallon drums of crude Attapulgite were dispersed with sodium polyacrylate. The slurry was made to 30% solids using 3.2% sodium polyacrylate based on the weight of the clay. The blunged slurry was screened over a 200 mesh screen and the −200 mesh fraction passing through the screen was retained for use. The +200 mesh fraction retained by the screen was discarded.

The slurry of Example 14 and Example 15 were each dried to a free moisture content of between 2–3%. Each of the dried Attapulgite clays were redispersed in water using a low shear apparatus.

Although many means may be used to mix the crude clay and aqueous dispersant, a preferred method is to use a high shear mixer. The high shear mixer more efficiently produces the desired mix of the clay with aqueous dispersant to separate the clay from the non-materials present in the clay.

Thus, it has been shown that by using the wet process method with either TSPP or sodium polyacrylate, that Attapulgite clay can be separated from grit and non-clay and can be dried to a free moisture content of approximately 2–3% which can be easily redispersed in water with low shear.

Obviously, many modifications may be made without departing from the basic spirit of the present invention. Accordingly, it will be appreciated by those skilled in the art that within the scope of the appended claims, the invention may be practiced other than has been specifically described herein.

What is claimed is:

1. A wet method of processing naturally occurring clay ore to separate Attapulgite clay from other materials comprising the steps of:
   crushing the clay ore,
   adding a dispersant to water,
   preparing a slurry of the clay ore with the aqueous dispersant to disperse the Attapulgite clay in the water,
   separating the dispersed Attapulgite clay from un-dispersed materials, and
   drying the dispersed Attapulgite clay to a free-moisture content of approximately 2–3%.

2. The wet method of claim 1, further comprising the steps of adding the dried clay to water and re-dispersing the clay using a low shear mixer forming a dispersion containing up to approximately 35% by weight of clay.

3. The wet method of claim 1, wherein the dispersant is sodium polyacrylate having a molecular weight between 4,000 and 5,000.

4. The wet method of claim 1, wherein the dispersant is tetrasodium pyrophosphate.

5. The wet method of claim 1, wherein the separated Attapulgite clay is in the form of elongated rods substantially free of grit and non-Attapulgite clay.

6. The wet method of claim 1, wherein the dispersed Attapulgite clay is dried using an air swept turbulent drier.

7. The wet method of claim 6, wherein the air in the drier is between 85° C. and 210° C.

8. A purified dry attapulgite clay having loosely bound, non-agglomerated elongated rods, free of grit and non-attapulgite clay prepared in accordance with the method of claim 1.

9. A wet method for separating and dispersing Attapulgite clay comprising the steps of:
   crushing naturally occurring clay,
   adding a dispersant to water,
   preparing a slurry of the naturally occurring clay with the aqueous dispersant wherein the clay is dispersed in the water,
   separating non-Attapulgite materials from the aqueous slurry of Attapulgite clay,
   drying the dispersed Attapulgite clay,
   adding the dry Attapulgite clay to water,
   and redispersing the clay in the water using a low shear mixer without the addition of further dispersant or a surfactant forming a dispersion containing up to approximately 35% by weight of Attapulgite clay.

10. The wet method of claim 9, wherein the dispersant is sodium polyacrylate having a molecular weight between 4,000 and 5,000.

11. The wet method of claim 9, wherein the dispersant is tetrasodium pyrophosphate.

12. The wet method of claim 9, wherein the non-Attapulgite material is quartz, dolomite, limestone, feldspar, diatomaceous, earth, mica, titania, aluminum montmorillonite, sepiolite, bentonite and kaolin.

13. An aqueous dispersion of attapulgite clay, free of grit and non-attapulgite clay, avoiding additional dispersants or surfactants, prepared in accordance with the method of claim 9.

14. A purified attapulgite clay comprising:
   a dispersant adsorbed to the surface of the clay,
   elongated rods substantially free of grit and non-Attapulgite clay,
   dried at atmospheric pressure in turbulent air at a temperature of 85° C.–210° C. avoiding stabilizers and grinding,
   and the attapulgite clay having a free-moisture content of approximately 0.1%–9%.

15. The attapulgite clay of claim 14, wherein the dispersant is sodium polyacrylate having a molecular weight between 4,000 and 5,000.

16. An aqueous dispersion of the attapulgite clay of claim 14, the dispersion containing up to approximately 35% by weight of attapulgite clay.

* * * * *